United States Patent
Meacham et al.

(10) Patent No.: US 12,467,644 B1
(45) Date of Patent: Nov. 11, 2025

(54) SYSTEMS AND METHODS FOR COMMERCIAL AIRSTREAM PRETREATMENT

(71) Applicant: Altaire Systems LLC, Ellisville, MO (US)

(72) Inventors: James Robert Meacham, Corona Del Mar, CA (US); James Ryan Johnston, Wildwood, MO (US)

(73) Assignee: Altaire Systems LLC, Ellisville, MO (US)

( * ) Notice: Subject to any disclaimer, the term of this patent is extended or adjusted under 35 U.S.C. 154(b) by 37 days.

(21) Appl. No.: 17/943,149

(22) Filed: Sep. 12, 2022

Related U.S. Application Data

(63) Continuation of application No. 16/560,904, filed on Sep. 4, 2019, now Pat. No. 11,441,797.

(51) Int. Cl.
| | | |
|---|---|---|
| *F24F 11/84* | (2018.01) | |
| *F24F 5/00* | (2006.01) | |
| *F24F 11/64* | (2018.01) | |
| *F24F 11/76* | (2018.01) | |
| *F24F 11/77* | (2018.01) | |
| *F24F 11/89* | (2018.01) | |
| *F24F 110/12* | (2018.01) | |
| *F24F 110/20* | (2018.01) | |

(52) U.S. Cl.
CPC ............ *F24F 5/0007* (2013.01); *F24F 11/64* (2018.01); *F24F 11/76* (2018.01); *F24F 11/84* (2018.01); *F24F 11/77* (2018.01); *F24F 11/89* (2018.01); *F24F 2110/12* (2018.01); *F24F 2110/20* (2018.01)

(58) Field of Classification Search
CPC .. F24F 11/64; F24F 11/76; F24F 11/77; F24F 11/89; F24F 11/84; F24F 2110/12; F24F 2110/20; F24F 5/0007
See application file for complete search history.

(56) References Cited

U.S. PATENT DOCUMENTS

| | | | | |
|---|---|---|---|---|
| 4,189,929 A | * | 2/1980 | Russell | ................... F25B 49/02 62/176.5 |
| 5,003,961 A | * | 4/1991 | Besik | ...................... F24F 3/147 165/4 |
| 5,579,647 A | * | 12/1996 | Calton | .................. F24F 3/1423 62/223 |
| 6,092,794 A | * | 7/2000 | Reens | ................. B01F 23/2132 261/115 |
| 10,955,152 B2 | * | 3/2021 | Schumacher | ........ A01K 1/0082 |

(Continued)

*Primary Examiner* — Nelson J Nieves
(74) *Attorney, Agent, or Firm* — Rutan & Tucker, LLP; Marc A. McClain

(57) ABSTRACT

Embodiments of the current disclosure include air pretreatment devices suitable for pretreatment of air received by air handler units. The air pretreatment devices can include an air intake configured to capture the outside air. A cooling coil system can process changes in the dry bulb and dew point temperatures of the captured outside air. The pretreated air can then be passed via an air outtake to the air handler. The cooling coil system can be coupled to at least a chilled water intake and a chilled water return line. Finally, a single water valve control unit located on either the chilled water intake or chilled water return line can be adjusted to direct a change in the dry bulb temperature and dew point temperature within the cooling coil system.

7 Claims, 11 Drawing Sheets

(56) References Cited

U.S. PATENT DOCUMENTS

| | | | | |
|---|---|---|---|---|
| 2009/0064692 A1* | 3/2009 | Duncan | ............. | F28F 1/00 |
| | | | | 62/93 |
| 2011/0023506 A1* | 2/2011 | Day | ............. | F24F 5/0035 |
| | | | | 165/104.34 |
| 2011/0238223 A1* | 9/2011 | Narayanamurthy | .. | F24F 5/0046 |
| | | | | 700/277 |
| 2011/0308766 A1* | 12/2011 | DeAngelis | ............. | F24F 3/044 |
| | | | | 165/59 |
| 2012/0012285 A1* | 1/2012 | Okamoto | ............. | F24F 3/153 |
| | | | | 165/110 |
| 2014/0165637 A1* | 6/2014 | Ma | ............. | F24F 5/0021 |
| | | | | 62/271 |
| 2017/0219224 A1* | 8/2017 | Duncan | ............. | F28F 1/00 |
| 2018/0066877 A1* | 3/2018 | Max | ............. | F28D 1/05383 |
| 2018/0224145 A1* | 8/2018 | Tajima | ............. | F24F 11/81 |
| 2018/0266724 A1* | 9/2018 | Wang | ............. | B29C 45/66 |
| 2018/0356108 A1* | 12/2018 | Eiermann | ............. | F24F 11/83 |
| 2019/0072292 A1* | 3/2019 | Froemke | ............. | F24F 5/0096 |
| 2019/0078796 A1* | 3/2019 | Eiermann | ............. | F24F 3/1405 |
| 2019/0193019 A1* | 6/2019 | Okano | ............. | F24F 8/125 |
| 2019/0277516 A1* | 9/2019 | Duncan | ............. | F24F 8/10 |
| 2019/0277523 A1* | 9/2019 | Wallace | ............. | F24F 11/62 |
| 2019/0323714 A1* | 10/2019 | Cui | ............. | F24F 3/14 |
| 2020/0018513 A1* | 1/2020 | Hamada | ............. | F24F 11/84 |
| 2020/0191422 A1* | 6/2020 | Phillips | ............. | F24F 3/001 |
| 2020/0284464 A1* | 9/2020 | Abdel-Salam et al. | .. | F24F 3/06 |
| 2021/0018185 A1* | 1/2021 | Sinha | ............. | F24F 11/70 |

\* cited by examiner

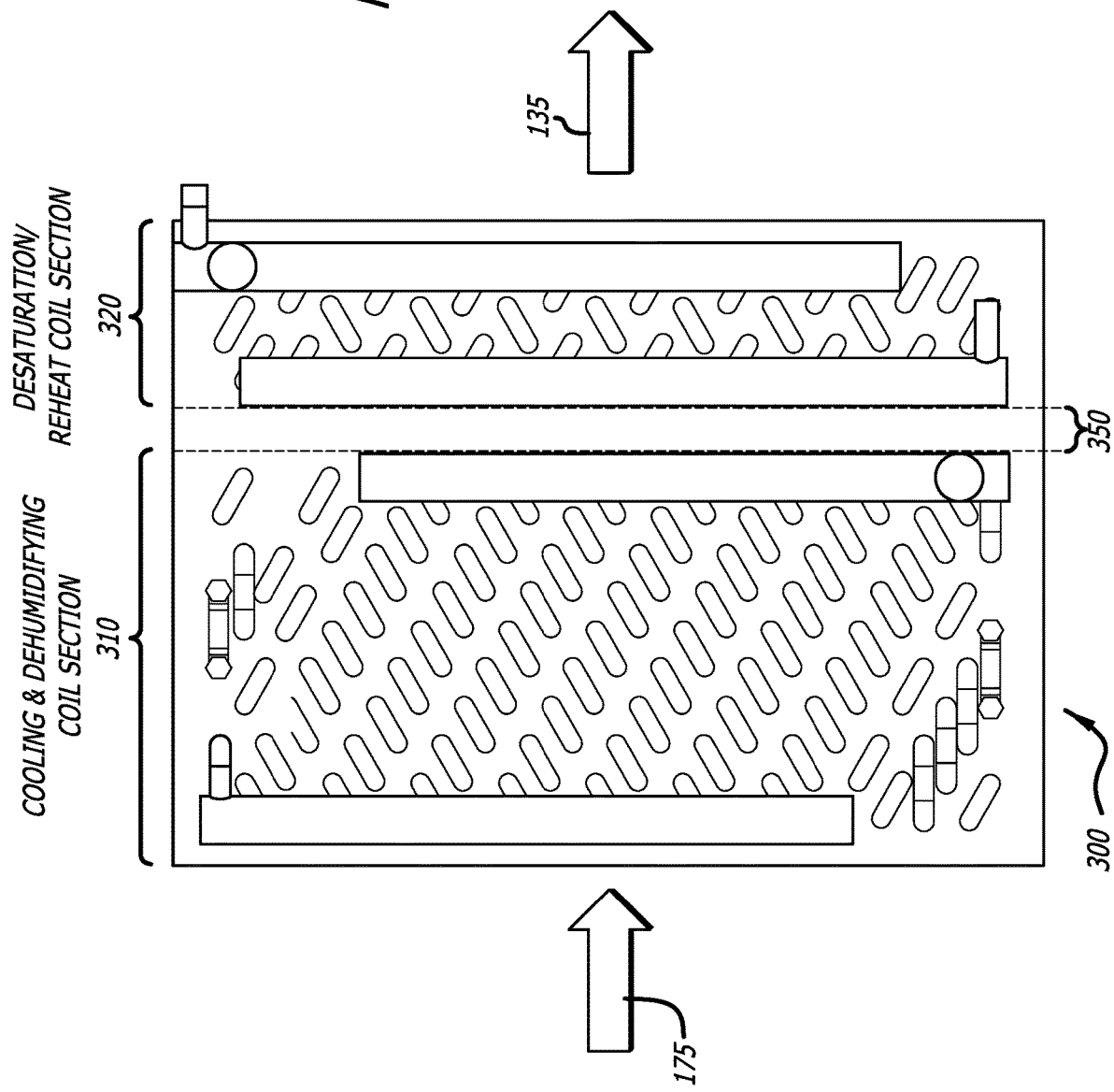

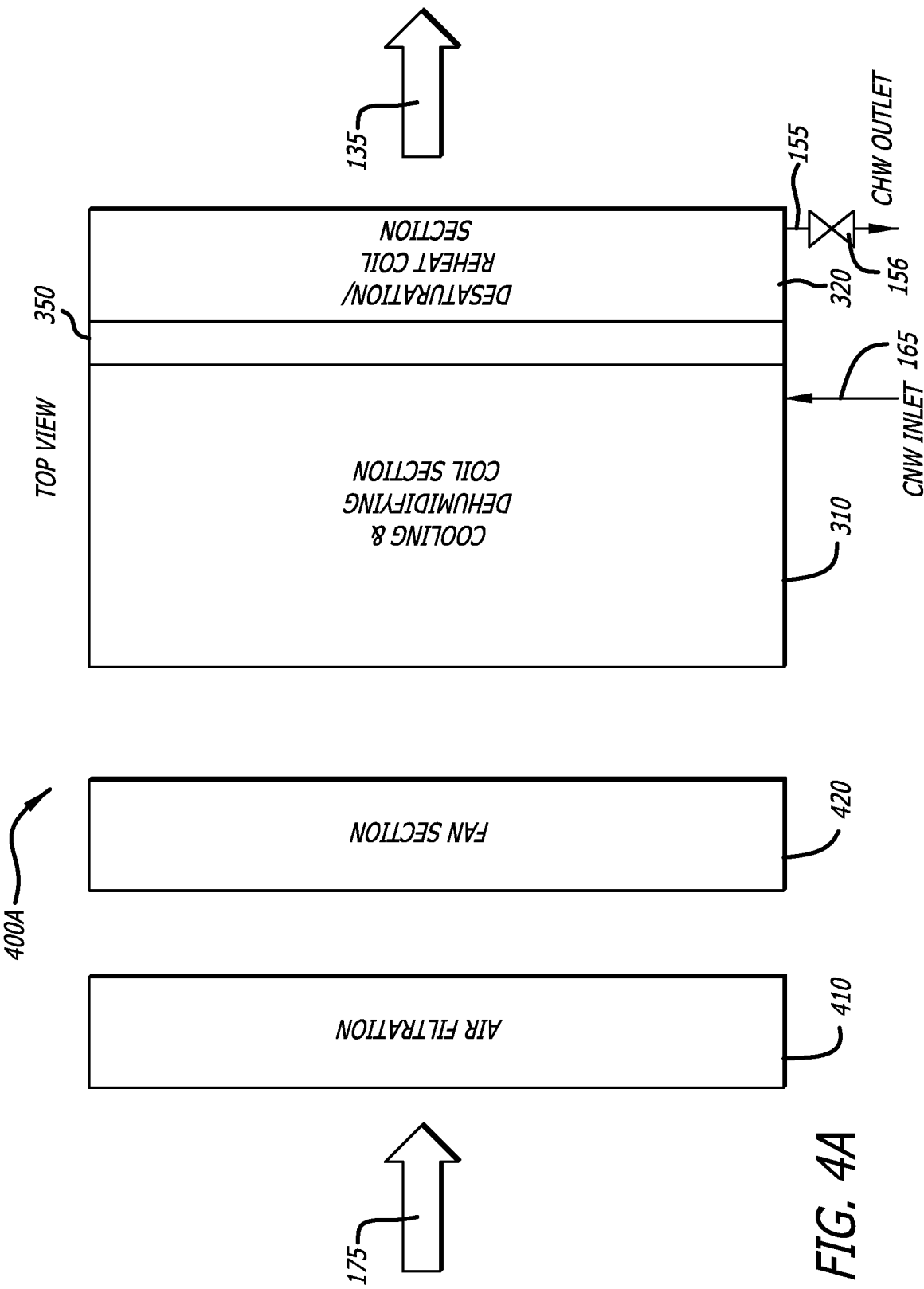

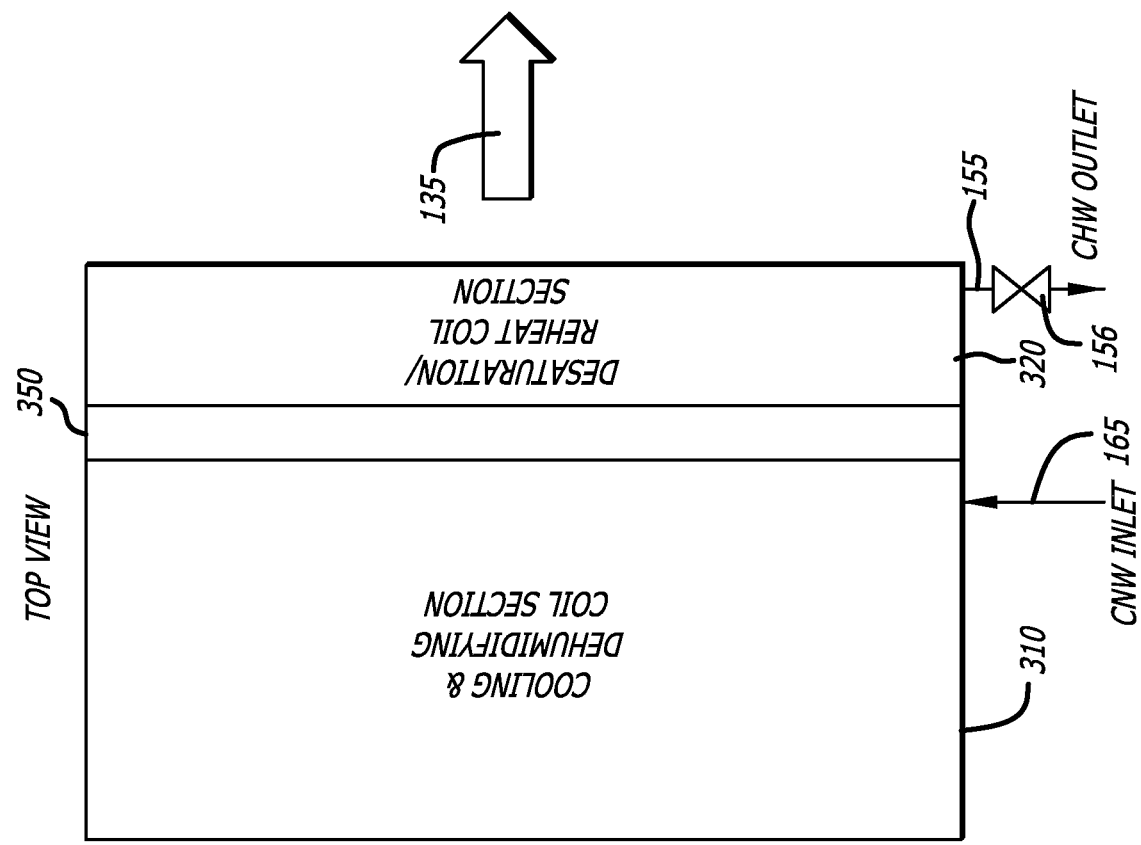
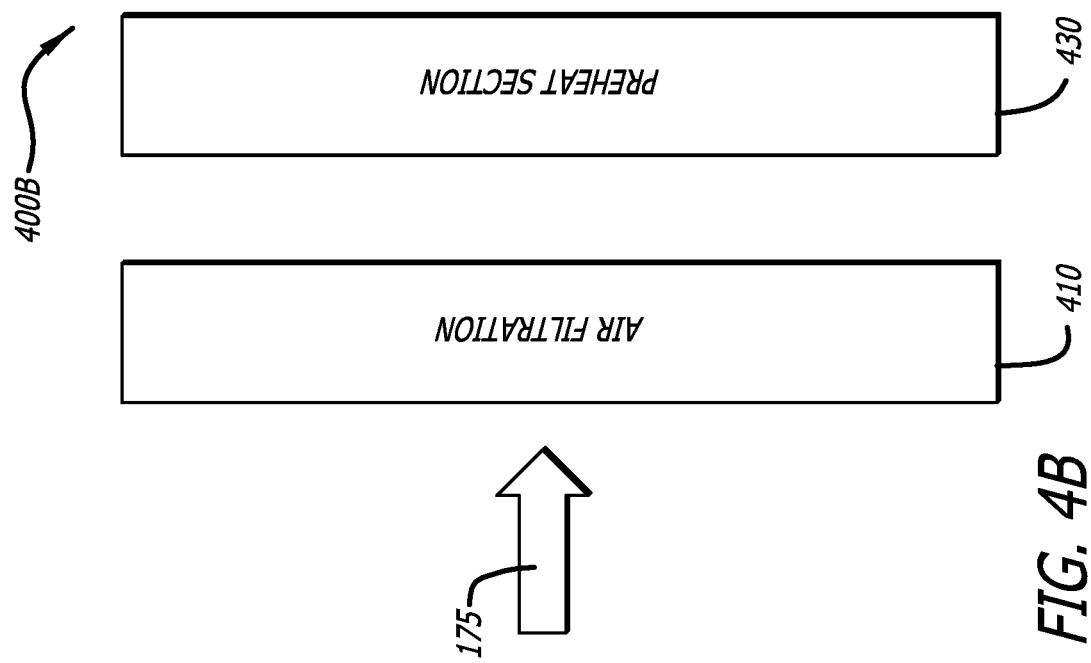
FIG. 4B

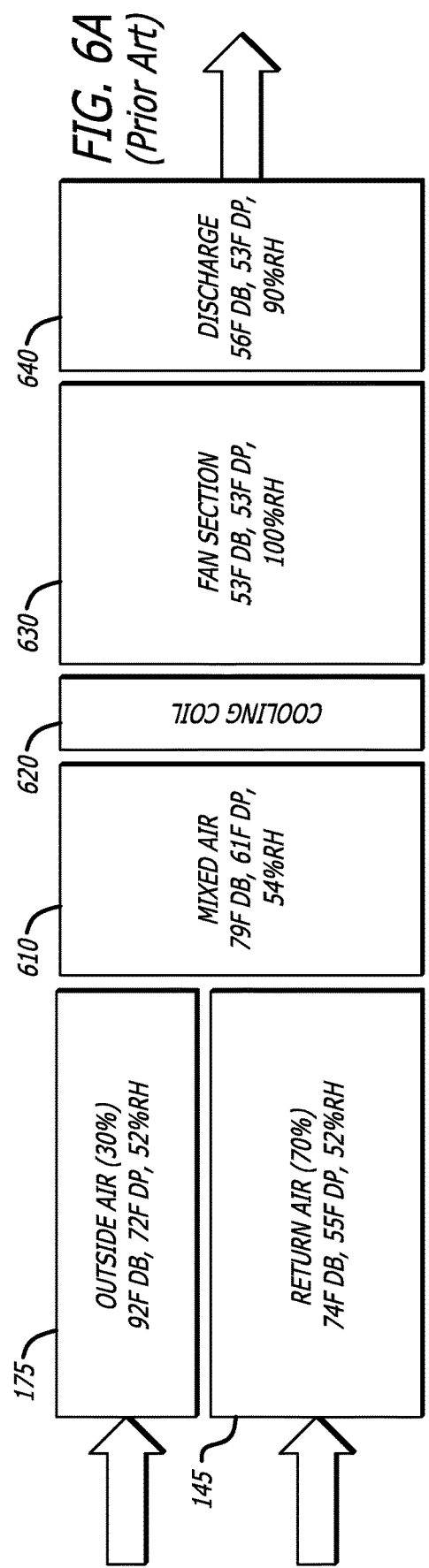
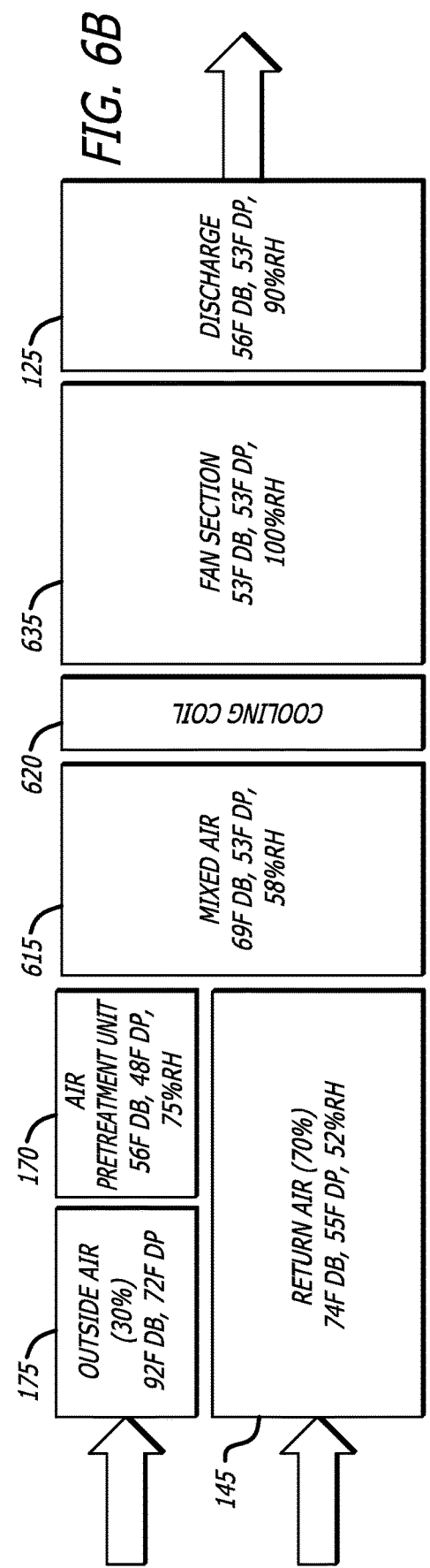

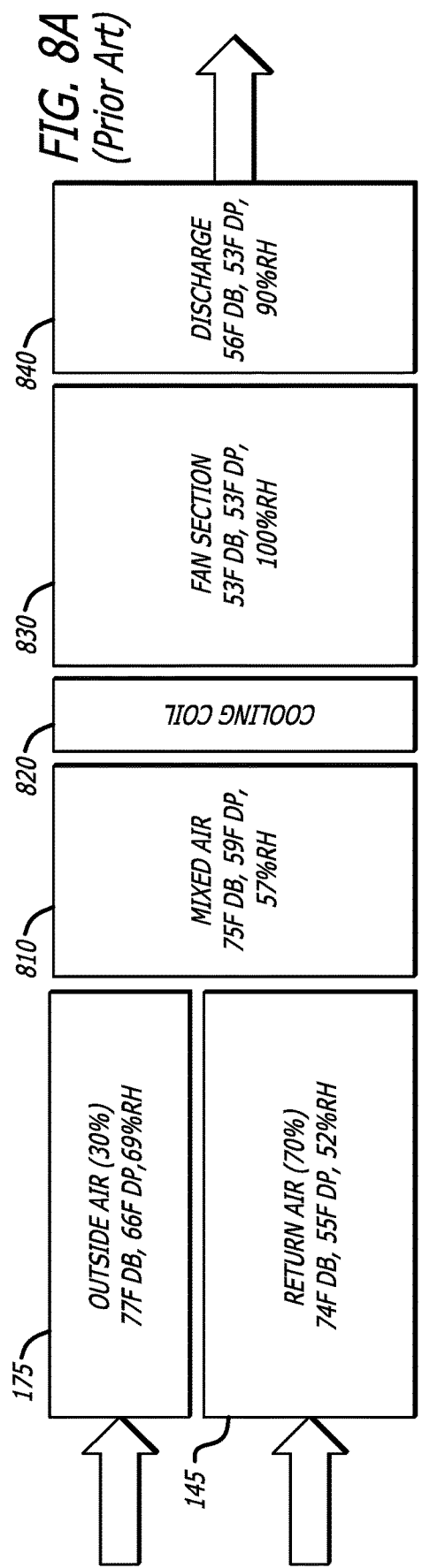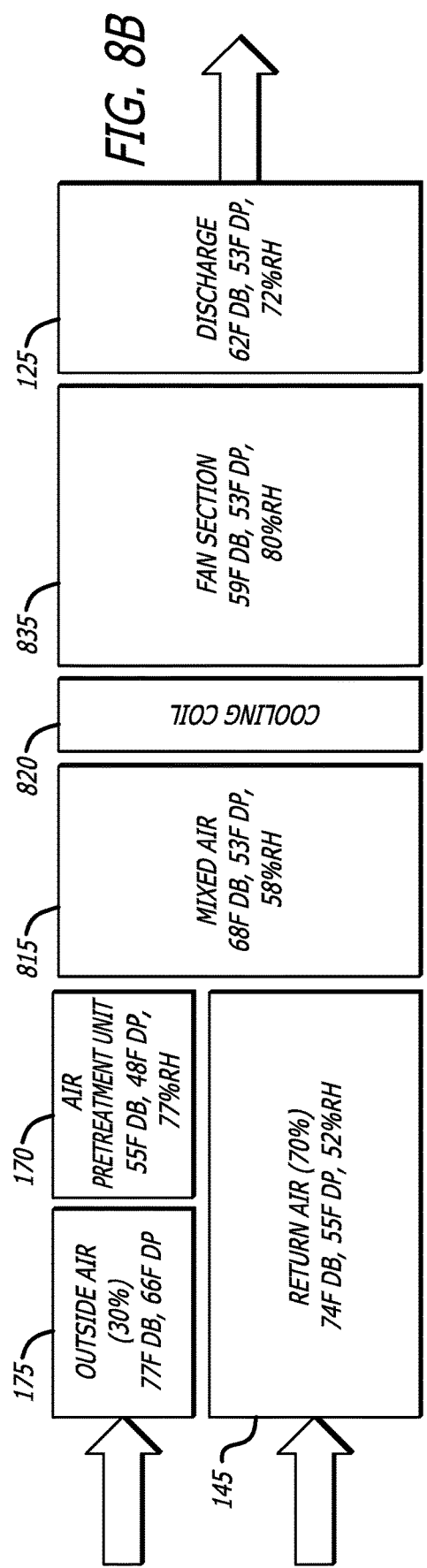

SYSTEMS AND METHODS FOR COMMERCIAL AIRSTREAM PRETREATMENT

CROSS-REFERENCE TO RELATED PATENT APPLICATIONS

This application is a continuation of U.S. patent application Ser. No. 16/560,904 filed Sep. 4, 2019, now U.S. Pat. No. 11,441,797 issued Sep. 13, 2022, the entire contents of which are incorporated by reference herein.

FIELD

Embodiments of the present disclosure technically relate to pretreatment of airstreams in commercial-grade air systems. More particularly, one embodiment of the present disclosure relates to an air pretreatment unit that can be fitted onto an existing air handler of a heating, ventilating, and air-conditioning ("HVAC") system.

BACKGROUND

Large-scale or commercial-grade heating, ventilating, and air-conditioning ("HVAC") systems are tasked with regulating various aspects of the air within a building or structure. This regulation involves controlling various aspects of the air including the dry bulb temperature (sensible heat), dew point temperature (latent heat), and the amount of fresh, outside air to add into the system, among others. Building-wide air regulation often occurs within an air handler unit of an HVAC system which can mix air obtained from both fresh outside air captured from intakes positioned outside of the building as well as returned air being recycled from inside the building. This mixed air is then processed over a set of cooling coils within the air handler to drop the dry bulb and dew point temperatures to a level set by a building administrator.

Often, building administrators will create a set dew point temperature target level that is lower than the incoming outside air and return air. To achieve this target dew point, moisture must be removed from the mixed air (composed of outside and return air) through a dehumidification process. Dehumidification is achieved by exposing the mixed air to cooling coils which are chilled to a temperature below the dew point temperature of the mixed air, causing the moisture in the mixed air to condense on the cooling coils. The mixed air is thus dehumidified and consequently cooled until the set dew point temperature target level is reached.

In certain climates, there can often be high dew point levels in the outside air that must be brought down to the set dew point temperature target level. This can require large amounts of moisture to be removed from the air. Typical pretreatment applications are limited because the dry bulb temperature of the incoming outside air can be lowered below the dew point temperature of the return air, which can lead to a "fogging" condition when both the outside and return airs are mixed prior to cooling. Fogging creates a visible water vapor that adds moisture into the HVAC system by creating condensation on various surfaces and carrying the moisture further downstream into the HVAC system, including the downstream filtration which would cause significant system issues.

Additionally, moisture and condensation events often occur due to poor control of leaving air dry bulb and dew point temperatures associated with typical air handler designs. Low dew point temperatures are required to ensure proper space humidity and moisture control. However, in most air handling systems, the control of dew point and dry bulb temperatures is linked, with a single control surface to accomplish both tasks. As a result, air leaving the air handling system must be overcooled to ensure proper dehumidification. Without adding additional energy from another source in the form of reheat, this high humidity, over cooled air is sent to spaces via ductwork and diffusers. In addition to overcooling spaces and reducing thermal comfort of occupants, if the dew point temperature of the space is above the dry bulb temperature of the air being delivered, which can often occur in humid climates, moisture can form in ductwork, on diffuser surfaces, and on surfaces near the diffusers where the air is introduced.

These moisture and condensation events within HVAC systems can cause a variety of problems. For example, when unwanted condensation occurs, such as on the air vents or diffusers, the resulting dripping and leaking of the condensate can cause damage as well as disrupt the activities of people within the building. Similarly, the presence of moisture within the HVAC system creates a greater likelihood of developing mold, mildew, allergens, and/or other biological contaminants. Exposure to these biological contaminants can lead to illness, allergic reactions, decreased productivity for the people inside the building, and can generate additional costs associated with removing the contaminants.

Some building administrators have responded to this presence of moisture by throttling or otherwise reducing the amount of outside air that is utilized within the HVAC system. The reduction in the amount of cooling needed lowers the amount of water being captured during the dehumidification process, thus reducing exposure to moisture. However, research has indicated that lower levels of outside air within a building can be associated with decreased worker productivity, among other problems. Additionally, many locations now have laws and/or building codes that require a certain amount of outside air to be used within the HVAC system, creating pressure for the building administrator to comply. These pressures are increased as certain locations experience climate changes that increase the likelihood of higher levels of moisture entering the HVAC system, especially for HVAC systems that were designed for pre-climate change conditions.

The costs associated with upgrading or installing new HVAC systems are often cost prohibitive as a large portion of the HVAC system would need to be replaced and/or modified. This leaves building administrators with few options to solve these problems.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 3 is an exemplary schematic illustrating components of the coil system of the air pretreatment unit in accordance with an embodiment of the invention;

FIG. 4A is an exemplary schematic illustrating additional filtration and fan modules of the air pretreatment unit in accordance with an embodiment of the invention;

FIG. 4B is an exemplary schematic illustrating additional filtration and preheat modules of the air pretreatment unit in accordance with an embodiment of the invention;

FIG. 6A is a schematic example of an HVAC system in a first weather condition without air pretreatment;

FIG. 6B is an exemplary schematic example of an HVAC system in a first weather condition with air pretreatment in accordance with an embodiment of the invention;

FIG. 8A is a schematic example of an HVAC system in a third weather condition without pretreatment;

FIG. 8B is an exemplary schematic example of an HVAC system in a third weather condition with air pretreatment in accordance with an embodiment of the invention.

Figure 1:
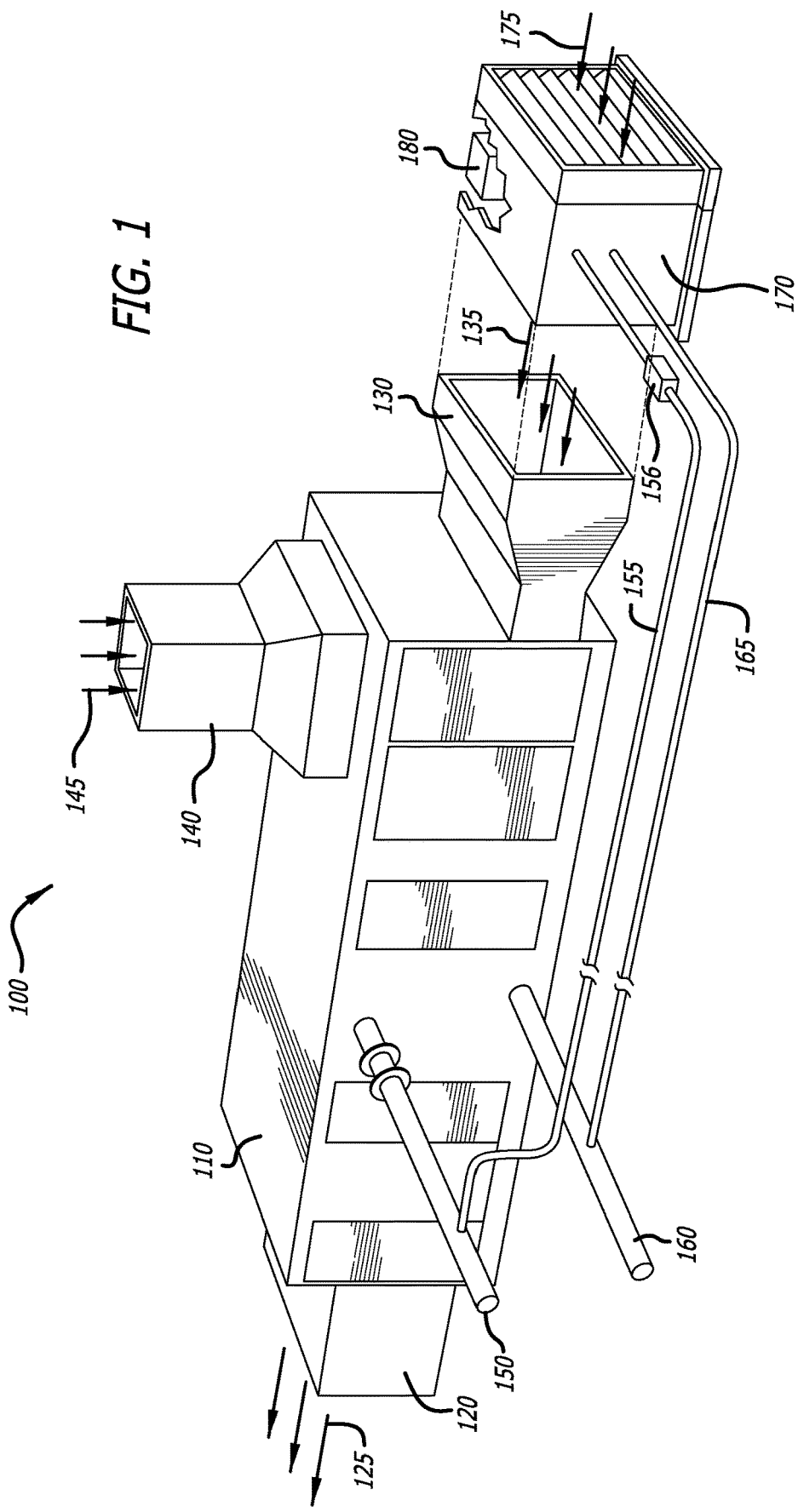
FIG. 1 is an exemplary exploded system diagram of the pretreatment HVAC system including an air handler unit and air pretreatment unit in accordance with an embodiment of the invention.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

The following description is not to be taken in a limiting sense, but is made merely for the purpose of describing the general principles of exemplary embodiments. The scope of the disclosure should be determined with reference to the claims. Reference throughout this specification to "one embodiment," "an embodiment," or similar language means that a particular feature, structure, or characteristic that is described in connection with the referenced embodiment is included in at least the referenced embodiment. Likewise, reference throughout this specification to "some embodiments" or similar language means that particular features, structures, or characteristics that are described in connection with the referenced embodiments are included in at least the referenced embodiments. Thus, appearances of the phrases "in one embodiment," "in an embodiment," "in some embodiments," and similar language throughout this specification can, but do not necessarily, all refer to the same embodiment.

Further, the described features, structures, or characteristics of the present disclosure can be combined in any suitable manner in one or more embodiments. In the description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure.

In the following description, certain terminology is used to describe features of the invention. For example, in certain situations, the term "logic" is representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage mediums may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

In response to the problems discussed above, embodiments of the present disclosure decouple the need for HVAC systems to provide both sensible and latent cooling. This is achieved by pre-treating the outside air prior to being distributed to the outside air intake of an HVAC air handler. For example, an air pretreatment unit may process air to a low enough dew point temperature such that dehumidification of the mixed air in the air handler is not needed. By utilizing data received from a sensor placed within the space or air return path of the HVAC system as well as sensors configured to measure the outside air, an air pretreatment unit can calculate the dew point temperature of air that must be provided from the outside air supply in order to achieve a mixed air dew point temperature that is at a pre-determined set point.

In other words, the air pretreatment unit can dehumidify the incoming outside air such that, when mixed with the return air, the dew point temperature of the mixed air is already at the desired dew point temperature of the air to be discharged from the HVAC system. As a result, the cooling coils of the larger air handler do not need to dehumidify the air, but instead, the operability of the cooling coils is directed to lowering the sensible heat, thus avoiding moisture exposure in the air handler and other downstream HVAC components. The air pretreatment unit can also utilize the received data to provide air to the HVAC system that has a dry bulb temperature that is greater than or equal to the dew bulb temperature in the sensed return air, which will avoid fogging.

The air pretreatment unit can be designed such that it is relatively small when compared to an air handler. Air pretreatment units as described in various embodiments of this disclosure can be coupled with large air handlers associated with HVAC systems installed in multi-tenant residential buildings, commercial buildings, and industrial buildings. In many cases, the air handler for the HVAC system is located on the roof of a building due to its size, which can create complications for navigating the pretreatment unit into position during installation. However, installation onto the outside air intake of a large HVAC system air handler can be more easily accomplished due to the smaller size of the air pretreatment unit embodiments disclosed herein. The easier installation is supported, in part, by the increased mobility options available as well as the reduced chilled water supply needs. In one embodiment, installation of the air pretreatment unit can occur over the span of a few days instead of a few weeks as with traditional upgrades and solutions. Furthermore, incorporated controllers and associated inputs and outputs of the air pretreatment unit can provide enhanced control of the entire HVAC system which facilitates increased system efficiency and moisture removal.

Additionally, due to the decreased size of the air pretreatment unit compared to an air handler, the air pretreatment unit can be made of a more durable material without substantially increasing the overall cost of the HVAC system. Air pretreatment units are often exposed to a greater amount of moisture, so utilizing more rust/corrosion resistant materials can be beneficial. By way of example and not limitation, an air pretreatment unit can be primarily constructed out of 50/50 aluminum alloys or 316 stainless steel. It is contemplated that other similar materials may be used, especially when their use can increase the longevity of the unit and/or reduce the build-up of biological contaminants or other unwanted objects within the unit.

Referring to FIG. 1, an exemplary exploded system diagram of an HVAC system 100 including an air handler unit 110 and an air pretreatment unit 170 in accordance with an embodiment of the invention is shown. Larger HVAC systems 100 often have an air handler 110 that functions to regulate and circulate air. This may be accomplished by utilizing cooling coils, air filters, and blowers, among other components. Air handlers come in many shapes and sizes and in commercial-grade applications, are often quite large, requiring installation on a rooftop as a "rooftop unit" ("RTU").

Generally, an air handler 110 comprises an air handler outside air intake 130 which is configured to capture outside air 175. The air handler 110 further comprises a return air intake 140 that captures return air 145 from the building. The captured outside air 175 and return air 145 are combined within the air handler 110 to create mixed air. The mixed air is often cooled and/or dehumidified through a cooling coil system inside the air handler 110. The cooling coil is typically provided a chilled water supply line 160 that delivers a constant supply of chilled water having a temperature below the desired temperature of the air to be cooled. Once used by the air handler 110, the chilled water is evacuated via a chilled water supply return 150. The mixed air that is cooled through the cooling coil system of the air handler 110 is then sent out through discharge vents 120 into the building or structure.

In various embodiments of the disclosure, an air pretreatment unit 170 can be attached to the air handler outside air intake 130 such that all outside air 175 is processed by the air pretreatment unit 170 before entering the air handler outside air intake 130. In such an arrangement, the air pretreatment unit 170 can provide pretreated air 135 to the air handler 110 outside air intake 130. The pretreated air 135 mixes in the air handler 110 with the return air 145 such that the cooling coil system is only needed to lower the dry bulb temperature and not extract moisture (dehumidify) the mixed air prior to pushing the processed discharge air 125 throughout the building via the installed discharge ductwork 120.

Installation of the air pretreatment unit 170 onto an existing HVAC system air handler 110 can be relatively simple compared to replacing the entire air handler 110. Once positioned onto the air handler outside air intake 130, a separate air pretreatment unit chilled water supply line 165 (also described as a "CHW Inlet") and chilled water supply return 155 (also described as a "CHW Outlet") may be installed. In one embodiment, due to the low flow rates of the air pretreatment unit 170 (see discussion in FIG. 3), the air pretreatment unit chilled water supply line 165 and chilled water supply return 155 can be configured to connect with and tap into the air handler chilled water supply line 160 and chilled water supply return 150. By utilizing the air handler chilled water supply and return lines 160, 150, further plumbing and other infrastructure changes are not necessary, reducing installation times and associated costs.

Control of the air pretreatment unit 170 is accomplished by a controller 180, which is configured with a series of inputs and outputs. In one embodiment, the controller 180 receives data from a sensor installed within the air handler return air intake 140 configured to sense characteristics of the return air 145. Based on the data received by the controller 180, the air pretreatment unit 170 can adjust various aspects of its functioning, including, but not limited to, increasing or decreasing the amount of cooling and/or dehumidification to be done to the outside air 175 in order to achieve a desired set temperature. Desired set temperatures are often set by a building administrator (i.e. a user who has authority to make changes to the HVAC system 100 at any time). In other embodiments of the disclosure, the controller 180 can adjust the amount of air to be processed by the air pretreatment unit 170 through control of an attached fan module (see discussion in FIG. 4A).

In many embodiments, adjustments to the amount of cooling and/or dehumidification on the outside air 175 is achieved through the use of a single air pretreatment unit control valve 156 placed on the air pretreatment unit chilled water supply return 165. The control valve 156 can be utilized to determine the amount of chilled water that is passed into the cooling coil configuration of the air pretreatment unit 170, which in turn can regulate the amount of cooling and/or dehumidification that is done to the outside air 175. In this way, the single control valve 156 can regulate both the dry bulb temperate and dew point temperature (and consequently the relative humidity) of the pretreated air 135 entering the air handler 110. Due to the single control valve design, the overall size of the air pretreatment unit 170 can remain relatively small compared to traditional systems that may use multiple control valves and/or multiple supply lines. This provides a means for offering a method for decoupling latent and sensible cooling for an HVAC air handler 110 while further decreasing the costs associated with installation.

Figure 2A:
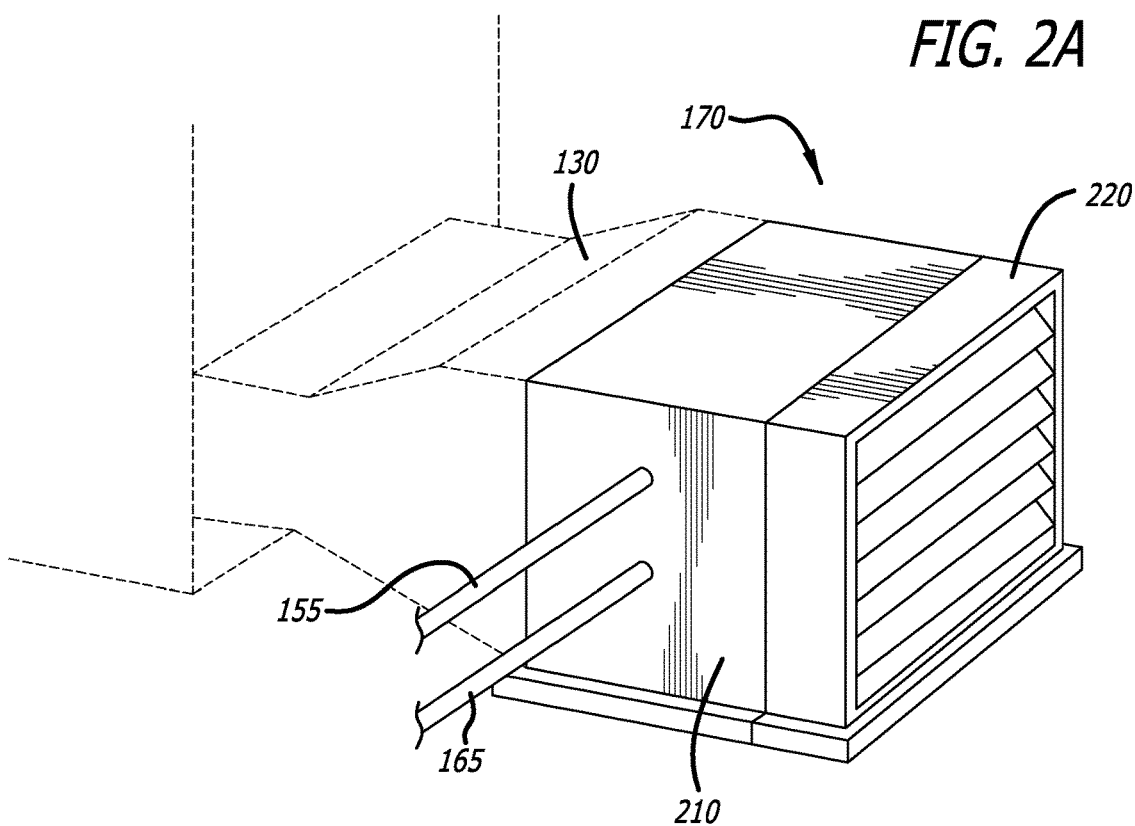
FIG. 2A is an exemplary diagram of an installed air pretreatment unit in accordance with an embodiment of the invention.

Referring to FIG. 2A, an exemplary diagram of an installed air pretreatment unit 170 in accordance with an embodiment of the invention is shown. When installed, the air pretreatment unit 170 can sit flush with the air handler outside air intake 130 such that all outside air 175 provided to the air handler 100 first flows through the air pretreatment unit 170. In this way, the dry bulb and dew point temperature of the mixed air within the air handler 110 can be modified, and in many embodiments, cooled to a desired level by pretreating the outside air 175.

In one embodiment, the air pretreatment unit 170 can be composed of two separate and distinct portions including, but not limited to, a coil portion 210 and a filtration portion 220. The portions of the air pretreatment unit 170 may be physically separated prior to installation, when performing maintenance, or when adding new functional modules. Once installed, the coil portion 210 and filtration portion 220 are attached together to function as a single unit. The air pretreatment unit 170 is configured to function with the filtration portion 220 facing away from the air handler 110 (to receive the outside air 175) and the coil portion 210 attached to the outside air intake 130 of the air handler 110 unless a trim chiller or other modular addition is utilized (see discussion in FIG. 4C). In a number of embodiments, the air pretreatment unit chilled water supply line 165 and chilled water supply return 155 are configured to be installed on the coil portion 210 of the air pretreatment unit 170.

Figure 2B:
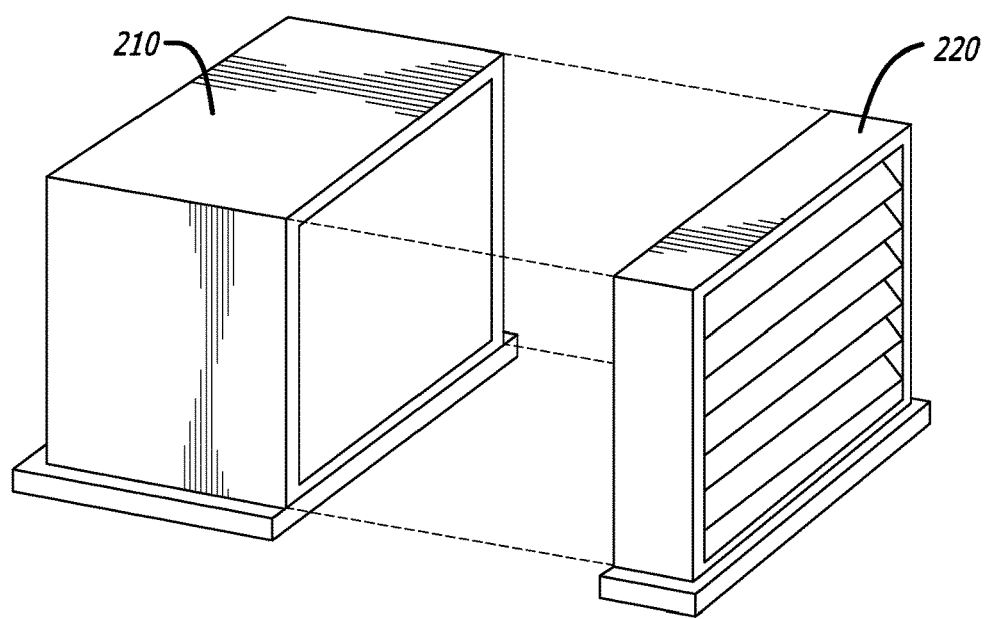
FIG. 2B is an exemplary diagram of a separated air pretreatment unit prior to installation in accordance with an embodiment of the invention.

Referring to FIG. 2B, an exemplary diagram of a separated air pretreatment unit 170 prior to installation in accordance with an embodiment of the invention is shown. The air pretreatment portions 210, 220 can be physically separated to provide easier means of transport during the installation process. In one embodiment, each portion 210, 220 of the air pretreatment unit 170 comprises at least one dimension that is less than thirty inches, which is equivalent to a standard doorframe. In this way, each portion 210, 220 of the pretreatment air unit 170 is sized to be transported to the installation site via easily accessible means, such as elevators, door, and stairwells. Thus, no special equipment is needed to move the air pretreatment unit 170 to the installation site, further reducing associated costs of installation. Traditional methods of pretreating the air generally involve multiple coil configurations which increase the overall size of traditional units such that they cannot be transported through typical doorways and elevators. The single coil configuration of the air pretreatment unit 170 facilitates the decreased size necessary to keep at least one dimension smaller than a standard doorway once the portions 210, 220 are separated. Furthermore, the ability to detach a coil portion 210 from a filtration portion 220 allows for the installation of additional functional modules (see discussion of FIGS. 4A-4C).

Referring to FIG. 3, an exemplary schematic illustrating components of the coil system 300 of the air pretreatment unit 170 in accordance with an embodiment of the invention is shown. The single coil configuration of the air pretreatment unit 170 can be comprised of two distinct sections separated by a physical coil gap 350. In the embodiment depicted in FIG. 3, the outside air 175 enters into a first cooling and dehumidifying coil section 310. The cooling and dehumidifying coil section 310 utilizes chilled water to cool the coils and fins within the coil section 310 to bring the temperature of the coil section 310 below the dew point temperature of the outside air 175. When the dew point temperature of the outside air 175 is more than the temperature of the cooling and dehumidifying coil section 310, water from outside air 175 will begin to condense on the fins of the coils, lowering the amount of moisture in the outside air 175.

A side effect of the dehumidification process is that the cooling necessary to reduce the moisture in the outside air 175 will also decrease the dry bulb temperature. In certain situations, the amount of cooling necessary to remove a sufficient amount of moisture may leave the dry bulb temperature too low or "overcooled." To avoid this problem, the coil system 300 also comprises a desaturation/reheat coil section 320 that can reheat the dry bulb temperature of the outside air 175 in order to convert it into pretreated air 135. By increasing the relative size of the desaturation/reheat coil section 320 relative to the size of the entire coil system 300, pretreated air 135 can have a much warmer temperature compared to typical air pretreatment configurations, which can eliminate fogging downstream in the HVAC system 100. In one embodiment, the integrated desaturation/reheat coil enables control of the conditions of the processed air 135 such that fogging does not occur when mixed with the return air 145.

A coil gap 350 is present between the cooling and dehumidifying coil section 310 and the desaturation/reheat coil section 320. In one embodiment, the coil gap 350 is wide enough to prevent water collected in the cooling and dehumidifying coil section 310 from transferring to the desaturation/reheat coil section 320. It is contemplated that the selected distance of the coil gap 350 may be based, at least in part, on the airflow rate expected by the air pretreatment unit 170. As the airflow rates increase across a first coil, a larger coil gap will be needed to prevent blown moisture from transferring from the first coil to a second coil. The air pretreatment unit 170 can function at a low airflow rate when a smaller coil gap 350 is advantageous while restricting water transfer between the cooling and dehumidifying coil section 310 and the desaturation/reheat coil section 320. Coil gaps 350 can be configured to be between 0.5 inch and 6 inches. In one embodiment, the coil gap 350 can be less than four inches and greater than 0.5 inches.

Traditional air handlers cannot perform this type of moisture separation offered by the coil gap 350 due to the volume of air to be processed, which can typically result in air flow velocities greater than 350 feet per minute. However, the air pretreatment unit 170 processes the incoming outside air 175, which constitutes only a fraction of an air handler's air volume (typically 10-50%). In certain embodiments, the airflow velocity of the air pretreatment unit 170 is less than 300 feet per minute and can be configured to operate at velocities of approximately 220 feet per minute or lower. These low airflow velocities allow for captured water droplets in the cooling and dehumidifying coil section 310 to fall relatively straight downward and evacuate the air pretreatment unit 170 without moving downstream to the desaturation/reheat coil 320. By functioning with slower moving outside air 175, more contact time is achieved with the fins of the cooling and dehumidifying coil section 310, improving the heat exchange (i.e. "ΔT") and reduces the flow rate of chilled water needed to function.

This coil design allows for the increased removal of moisture from the outside air 175, while providing a more compact and efficient method of removing water from the HVAC system 100. By providing pretreated air 135 that has a dew point temperature that, when mixed with the return air 145, is already at the desired level desired by a building administrator, the cooling coil of the air handler 110 does not have to dehumidify the air. In effect, this means that the air handler 110 will not have to capture, and thus will not have to be exposed to, any moisture within the air handler 110 or downstream in the HVAC system 100. This can reduce the potential for the spread of biological contaminants as well as increase the longevity of the HVAC system 100.

Another benefit of the design of the coil system 300 is that pressure differential measurements for determining total pretreated air flow volumes are more reliable. In particular, the cooling and dehumidifying coil section 310 is very wet due to the moisture being extracted from the air and thus has an associated pressure drop across it that fluctuates with the amount of moisture removal from the treated air. The desaturation/reheat coil section 320 however, is very dry due to the low airflow rates and coil gap 350. This combination of dehumidifying with the upstream coils that ensures dry downstream coils allow for a more accurate pressure drop reading and thus determination of air flow rate. As those skilled in the art will understand, a reliable pressure differential reading can be a reliable indicator of airflow and is typically difficult to obtain. Thus, the design of the coil system 300 provides for an accurate, reliable, and low maintenance outside airflow monitor.

Referring to FIG. 4A, an exemplary schematic illustrating additional filtration and fan modular components of the air pretreatment unit 170 in accordance with an embodiment of the invention is shown. The design of the air pretreatment unit 170 allows for the addition of supplementary functionalities. These functionalities can be provided in the form of modules that are installed into an existing air pretreatment unit 170. The modularity of the additional modules allow for a simple installation by providing a uniform shape and interconnectivity. In one embodiment, the selection and installation of additional modules can be done at the factory during the time of purchase. Any modules configured for installation on the air pretreatment unit 170 can be configured to retain physical dimensions such that each of the two or more portions of the separated air pretreatment unit 170 still fit within a standard doorway. Two modules that can be added to the air pretreatment unit 170 to supplement functionality is an air filtration module 410 and a fan section module 420.

The embodiment of the air pretreatment unit 170 illustrated in FIG. 4A as a modularized air pretreatment unit 400A depicts the addition of an air filtration module 410 connecting to a fan section module 420. In other embodiments, the air filtration module 410 can be added as a module to the outside air facing filtration portion 220 of the air pretreatment unit 170 illustrated in FIG. 2. The air filtration module 410 can provide an extra layer of filtration to the overall HVAC system 100. This additional layer can reduce downstream filter loading and increase HVAC filter lifespans. It is contemplated that the air filtration module 410 can be added on top of other modules depending on the application, including, but not limited to, a fan section module 420.

A fan section module 420 may also be installed as a supplementary module to an air pretreatment unit 170 for a variety of reasons. In one embodiment, the default configuration of the air pretreatment unit 170 does not require a fan to pretreat air and can rely on an existing fan within the HVAC system 100 to provide the pressure needed for proper function. The low air velocities needed for the air pretreatment unit 170 allow for reliance on this type of low-pressure drop without the need for an additional fan. However, in certain installations, the pressure available from the existing fan may not be sufficient and/or a fan may not be installed within the existing HVAC system. Thus, the modularized air pretreatment unit 400A can provide greater airflow control.

Other conditions exist when the fan section module 420 may be needed. For example, although total air volumes of the air handling system may be fluctuating throughout the day, the building administrator may desire to have a constant outside airflow rate to ensure adequate ventilation to the indoor spaces. Addition of the fan section module 420 can ensure constant pretreatment air flow rates thus allowing an existing HVAC system to satisfy a building code in situations when their prior configuration was unable to.

In certain conditions, a building administrator may wish to turn off the main HVAC system 100 or the HVAC cooling coils to save money, such as during the night. In certain climates, when the HVAC system shuts off, vapor pressure will cause moisture to enter the building. When this happens, the moisture that enters will likely condense, as the dew point temperature of the outside air entering the building is higher than the dry bulb temperature of the indoor spaces in the building, adding unwanted moisture throughout the building. Therefore, in these climates, the HVAC system 100 runs continuously through the day and night, even if the building is unoccupied. In one embodiment, the modularized air pretreatment unit 400A can operate in an after-hours protection mode which ignores the dry bulb temperature and focuses on the dehumidification, thus keeping the building pressurized and free of unwanted moisture. Integration with the air handler 110 is required for this mode, but can allow for much less energy usage during unoccupied hours when engaged. Running the fan section module 420 is typically more cost effective than running the fan/blower on an HVAC system 100.

Additionally, in certain embodiments, the air pretreatment unit 170 can utilize onboard fans either in the fan section module 420 or by controlling the fans/blowers and air dampers within the air handler 110 to provide a constant outside airflow control mode. In such a mode, an HVAC system 100 without installed actuators can have new actuators installed and provide control of the dampers by the air pretreatment unit 170. Downstream dampers may also be manipulated and adjusted by the air pretreatment unit 170 during this mode. If the existing air handler 110 has sufficient pressure capacity in the existing fan, this can allow the outdoor air rate to be controlled without the need for the additional fan section 420.

Referring to FIG. 4B, an exemplary schematic illustrating additional filtration and preheat modular components 410, 430 of the air pretreatment unit 170 in accordance with an embodiment of the invention is shown. In certain cold climates, the outside air 175 may need to be heated before it can be pretreated and eventually processed by the HVAC system 100. The embodiment of the air pretreatment unit illustrated in FIG. 4B as a modularized air pretreatment unit 400B comprises a preheat module 430 that can add heat to the outside air 175 before crossing the coil sections 310, 320. The preheat module 430 of the modularized air pretreatment Unit 400B can be configured to monitor the dry bulb and dew point temperature of the outside air 175 and operate the preheat module 430 to avoid the coils 310, 320 from freezing. The addition of a preheat module 430 can also increase the capacity and improve the control of the existing HVAC system 100.

Figure 4C:
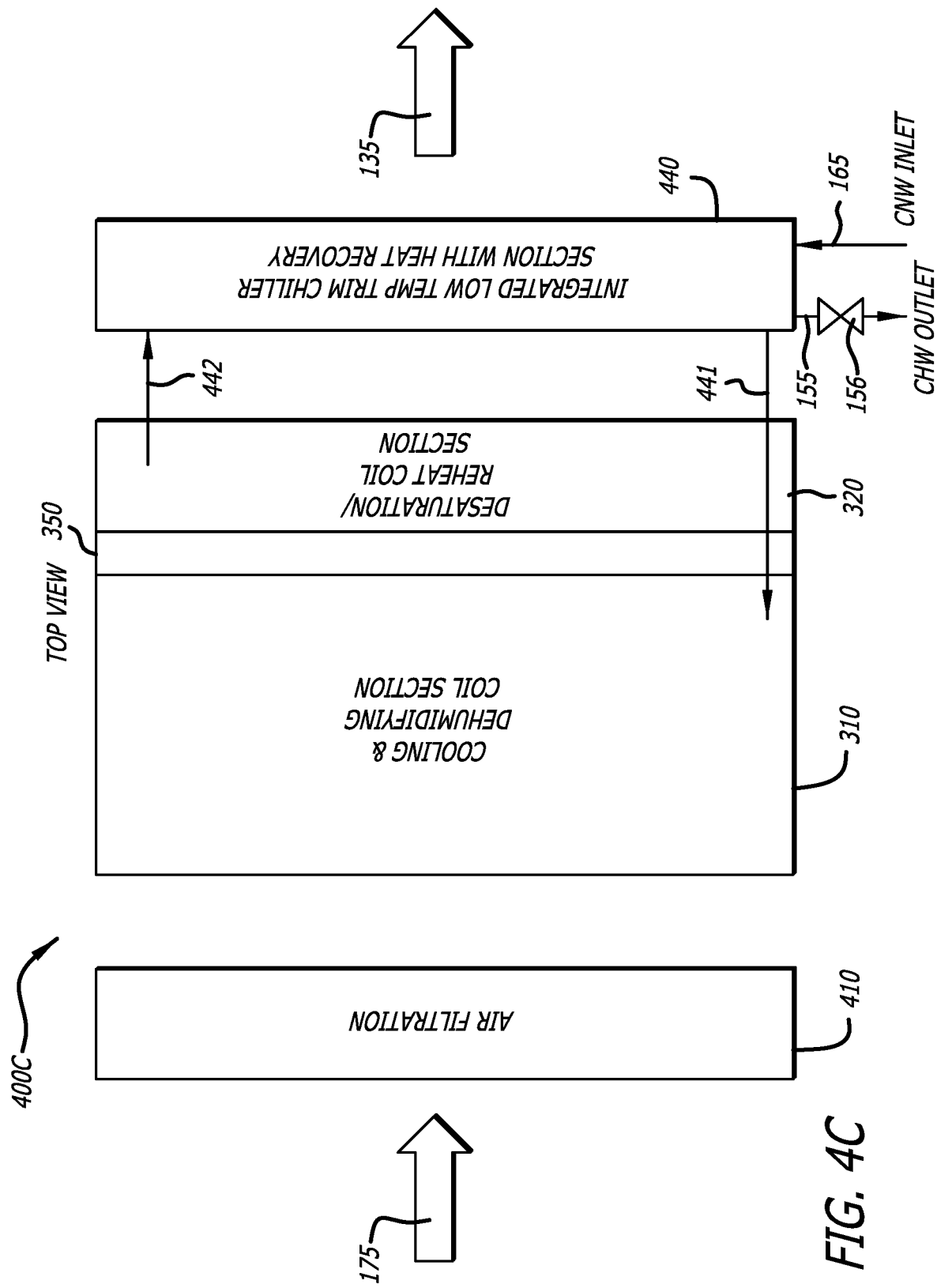
FIG. 4C is an exemplary schematic illustrating additional filtration and trim chiller modules of the air pretreatment unit in accordance with an embodiment of the invention.

Referring to FIG. 4C, an exemplary schematic illustrating additional filtration and trim chiller modules 410, 440 of the air pretreatment unit 170 in accordance with an embodiment of the invention is shown. Certain buildings or structures may require specialized air temperatures. Areas used by pharmaceutical companies, operating rooms, clean rooms and/or other specialized use cases may require a dew point level that is lower than what can be achieved with the standard chilled water supply line 165. For example, a building administrator may require a dew point temperature of 35 degrees, but achieving that with a standard air pretreatment unit 170 would be thermodynamically impossible when the chilled water input line 165 is 45 degrees.

The embodiment of the air pretreatment unit 170 illustrated in FIG. 4C as a modularized air pretreatment unit 400C depicts a trim chiller module 440 that can decouple the main chilled water supply line temperature from the dehumidification requirements. This process can be accomplished by utilizing a coolant-based heat exchanger system within the trim chiller module 440 to chill the water coming from the chilled water supply line 165 below the initial temperature and sending the further chilled water to the cooling and dehumidifying coil section 310 via a trim chilled water inlet 441 for ultra-cooling the outside air 175. The heat captured in the cooling and dehumidifying coil section 310 and across the desaturation/reheat coil section 320 during the ultra-cooling process can then be transferred back to the trim chiller module 440 via a trim chiller water outlet 442 for further heating of the pretreated air 135 to avoid fogging downstream in the HVAC system 100. The used chilled water is then returned to the main chilled water supply return 150 via the air pretreatment unit chilled water supply return 155. It can be seen that this configuration would require the installation or reinstallation of the air pretreatment unit chilled water supply line 165 and chilled water supply return 155 into the trim chiller module 440 instead of into the coil portion 210 of the air pretreatment unit 170. Typically, the costs associated with installing a trim chiller on the air pretreatment unit 170 are far less than adding similar functions to an existing HVAC system 100.

It is contemplated that any of the modules described within FIGS. 4A-4C, as well as modules not specifically described within this disclosure may all be combined in any combination based on the desired application of the building administrator. Due to the modularity of the air pretreatment unit design, each of the modules 410-440 can be added or rearranged as needed. This modularity can be achieved through a series of one or more contacts and/or interconnect points located on the modules. These interconnect points can be placed in uniform positions on each module to increase their compatibility. Furthermore, modules not described here may be developed that can be compatible with the modular design described here for the air pretreatment unit 170. The configurations described in FIGS. 4A-4C are not intended to be limiting to those configurations and/or arrangements only.

Figure 5:
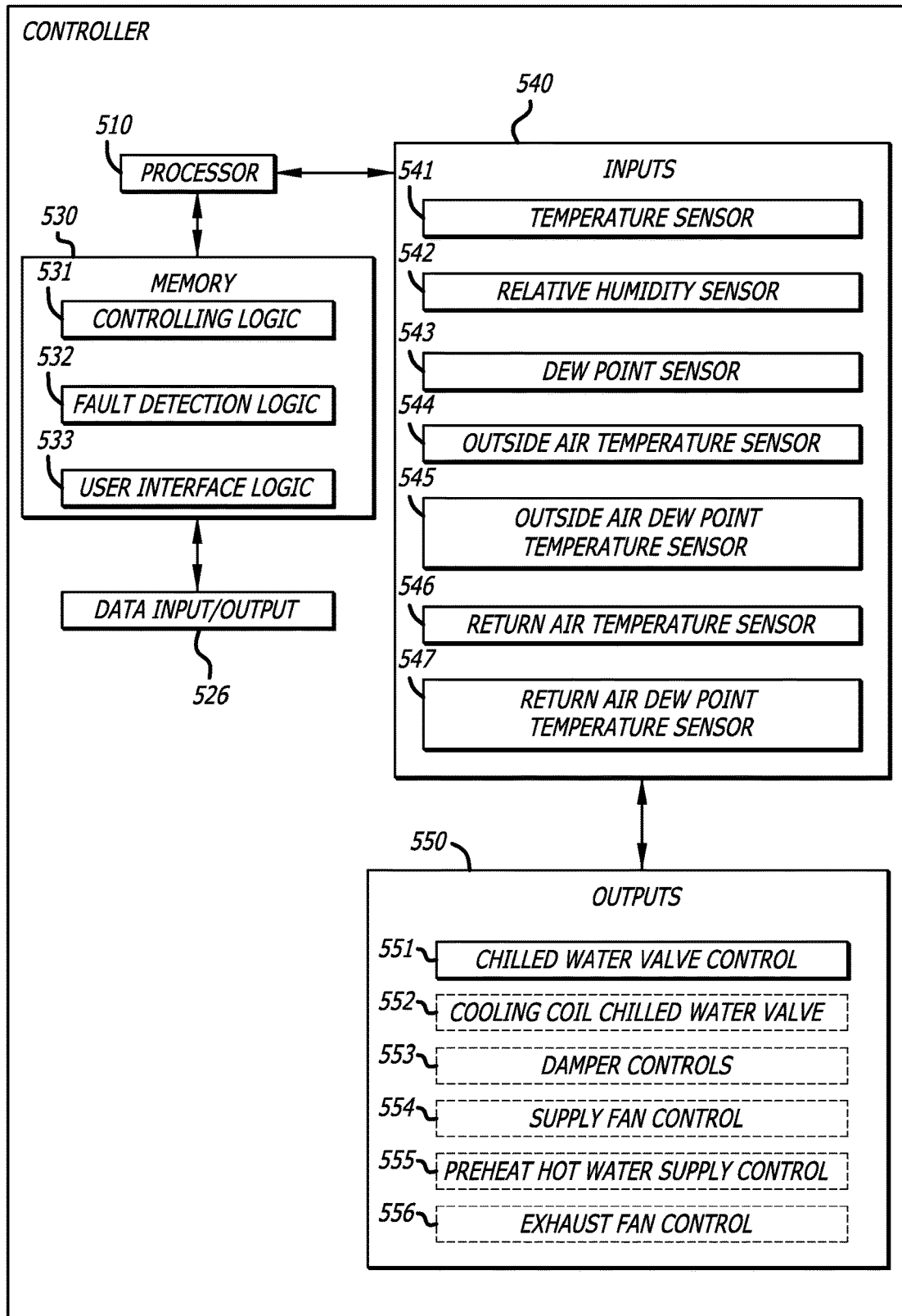
FIG. 5 is an exemplary logic diagram of a controller of the air pretreatment unit in accordance with an embodiment of the invention.

Referring FIG. 5, an exemplary logic diagram of an embodiment of the controller 180 of the air pretreatment unit 170 is shown. The controller 180 of the air pretreatment unit 170 can allow for automated operation with heuristics configured to achieve desired temperature set points set by a building administrator. In one embodiment, the air pretreatment unit 170 has a set of heuristics installed during assembly which can then be utilized by the building administrator after installation. In one embodiment, pre-installed heuristics can be operated by building administrators just by setting a target dew point temperature level. However, more information and data can be utilized by the controller 180 to better increase the efficiency of the air pretreatment unit 170 and the entire HVAC system 100.

As further shown in FIG. 5, the controller 180 includes a processor 510 in communication with a memory 530, data input/output 526, as well as a series of inputs 540 and outputs 550. In some embodiments, the memory 530 may include one or more software logics that, when executed by one or more processors, performs functions associated with operating the air pretreatment unit 170. The memory 530 may include a controlling logic 531, a fault detection logic 532, and a user interface logic 533. For instance, the controlling logic 531 may provide a set of heuristics that can be utilized to achieve a pre-determined temperature set point. These heuristics can be configured to operate based on a variety of available data, including data received from the inputs 540.

The inputs 540 generally refer to any means of communicating external data into the controller 180. The inputs 510 may include a series of sensors including an internal temperature sensor 541, internal relative humidity sensor 542, internal dew point sensor 543, outside air temperature sensor 544, outside air dew point sensor 545, return air temperature sensor 546, and return air dew point sensor 547. It can be understood that during installation, the internal sensors 541-543 and the outside air sensors 544, 545 can be pre-installed without the need for individual programming by the installer (i.e. a user who has the ability to make changes to the HVAC system 100 only during the installation process). In one embodiment, a basic installation includes the installation of the return air sensors 546, 547 which include the installer placing a sensor probe into the return air intake 140 and connecting the probe to the controller 180. It is contemplated that the connection between the probe and the controller 180 can be either wired or wireless and can depend on the specific layout and/or application of a particular installation and HVAC system 100.

Further pieces of configuration data can be input by an installer and/or building administrator that can aid the heuristics of the controlling logic 531. For example, data associated with the configuration of the current HVAC system 100 can be submitted including, but not limited to, the HVAC system airflow velocities, air volume, percentage of outside air 175 utilized compared to return air 145, desired leaving air and return air dew points, etc. Further data relating to the configuration of the building can also be entered by the installer and/or building administrator including, but not limited to, building size, number of rooms, number of zones, set dew point, and/or variations in the set dew point (e.g. changes in set dew point temperature based on time of day, weekends versus weekdays, etc.).

The controlling logic 531 can receive data associated with the dry bulb temperature and dew point temperature of the outside air 175 being processed, along with data associated with the dry bulb and dew point temperatures of the return air in order to generate a first set dew point temperature. The first set dew point temperature is equal to the desired dew point temperature of the processed discharged air 125 of the HVAC system 100.

To generate processed discharge air with a first set dew point temperature, the heuristics of the controlling logic 531 determine a second set dew point temperature for the pretreated air 135 entering the air handler 110 from the air pretreatment unit 170. The second set dew point temperature is calculated, in part, by determining the proper mixture of outside air 175 and return air 145 within the air handler 110 such that when both outside air 175 and return air 145 are combined, the dew point temperature of the mixed air will be equal or relatively close to the first set dew point temperature of the eventual processed discharge air 125. The controller 180 can generate commands to achieve this second set dew point by issuing commands to open or close the control valve 156 via the chilled water valve control output 551.

Typically, but not always, the return air 145 will have a dew point temperature higher than the first set dew point temperature of the desired processed discharge air 125. As a result, the heuristics of the controlling logic 531 will generate a second set dew point temperature for the pretreated air 135 that is below the first set dew point temperature. This results in the lower second dew point temperature and the higher return air dew point temperature balancing out to the first set dew point temperature when mixed inside of the air handler 110.

As can be understood by those skilled in the art, the accuracy of determining the second set dew point temperature of the pretreated air 135 by the heuristics of the controlling logic 531 can be enhanced when the controller 180 receives more configuration and input data. In addition to the sensor inputs 541-547 that can be connected to the controller 180, the controlling logic 531 can receive even more data from other components within the existing HVAC system through communication via the data inputs/outputs 526.

Many HVAC systems utilize the building automation and control network (BACnet) protocol for data communications transfer over various data links. In one embodiment, the controller 180 has at least one connection via the data input/output 526 that can communicate with the existing HVAC system 100 via BACnet. When in communication with the HVAC system 100, the heuristics within the controlling logic 531 can receive additional data relating to, for example, the current state of the cooling coils within the HVAC system 100, the conditions of the processed discharge air 125, the current mix (i.e. percentage) of outside air 175 in relation to return air 145, the current conditions of the air within the building or structure, the particular conditions within a number of zones within the building, the current state of the fan/blowers, the current state of the air handler chilled water intake line 160 and associated control valve, among others.

Optional installations of the air pretreatment unit 170 can include a series of outputs 550. For example, the optional outputs may comprise a cooling coil chilled water valve 552 to control the chilled water supply line 160 of the air handler 110, damper controls 553 to change the positions of the dampers as needed, a supply fan control 554 to change the speed or on/off state of the supply fans within the HVAC system 100, a complimentary exhaust fan control 556 for adjusting the speed or on/off state of the exhaust fans, and preheat hot water supply control 555 for controlling HVAC systems 100 that include a hot water intake line.

In some embodiments with at least one of the optional outputs 552-556, the heuristics of the controlling logic 531 can be configured to take control of the available components within the HVAC system 100 up to and including control of the entire HVAC system 100. These outputs 552-556 can be configured to issue commands via BACnet communication links within the HVAC system 100. When available, the controlling logic 531 can issue commands based on a desired dew point temperature or other criteria based on input received from the installer and/or building administrator. In certain embodiments, this supplanting of the current HVAC system control may provide greater efficiency to the overall system as the controlling logic 531 has access to more points of data to make determinations and issue commands.

In some embodiments, the heuristics of the controlling logic 531 may have access to historical temperature and/or control data. By utilizing historical data, the controlling logic 531 may better be able to calculate more optimal dew point temperature settings and issue commands to control the air pretreatment unit 170 and/or other components within the HVAC system 100 to achieve increased optimization. Historical data may be provided by the installer and/or building administrator, it can be downloaded from the HVAC system or other network connected device, and/or it can be collected over time by the controlling logic 531. Historical data can comprise patterns of past set dew points based on time of day, day of the week or year, changes in zone temperatures, or any other collected data that may be useful in determining future set temperatures.

In further embodiments, the heuristics of the controlling logic 531 can generate predictions of future desired set temperature points based on received weather forecast data. A device or other connection may exist via the data input/output 526 that provides the controlling logic 531 access to upcoming weather forecasts near the building or structure. Often, forecasts are needed only four hours into the future in order to properly predict and set a new dew point or other temperature within the air pretreatment unit 170 and/or HVAC system 100. For example, received forecast data may indicate that a strong rainstorm will arrive at the building within the next two hours. As a result, the controlling logic 531 can issue a command via the chilled water valve control output 551 to the control valve 156 to open and facilitate an increased amount of dehumidification in order to dry out the building prior to the large influx of moisture coming in from the rainstorm. In this way, forecast data can be utilized to better maintain a stable air quality within the building or structure.

In certain embodiments, the installer and/or building administrator may desire that the air pretreatment unit 170 be synced (i.e. slaved) to a controller within the HVAC system 100. The data input/output 526 of the controller 180 can provide a means of receiving control signals from another source. The control signals can be received via the BACnet protocol over a data connection, a specialized physical input could be added to the inputs 540 to facilitate direct communication between the controller 180 and the controlling source, and/or the control signals could be received wirelessly over a network connection including, but not limited to, the Internet. In one embodiment, the air pretreatment unit 170 is synced via control signals sent from a specialized external control device that is not installed within a separate HVAC component or system 100.

In many embodiments, the inputs 540 and outputs 550, including optional outputs 552-556 can come preinstalled on the controller 180. These inputs 540 and outputs 550 can require separate physical connections on the controller 180. Connection to these inputs 540 and outputs 550 can be achieved by inserting a control wire. Other methods of connection of the inputs 540 and outputs 550 of the controller 180 to data communication devices/sensors may encompass wireless or wired connection with BACnet or other data transmission protocols. It is contemplated that the specific physical connections on the controller 180 can be universal inputs 540 and outputs 550, or they may be changed to be compatible with a manufacturer specific format.

Often, any fault within the HVAC system 100 or air pretreatment unit 170 can create large problems. Therefore, it is useful that the building administrator is quickly notified to remedy any faults. In one embodiment, the memory 530 may include a fault detection logic 532 that can create a fault message (i.e. alarm) to transmit to the building administrator or any other user configured to be notified when a particular set point or other input has exceeded a pre-determined threshold. Fault messages can often be configured to conform to standard BACnet protocol fault messages and can be transmitted through BACnet communication links to any predetermined location or device. In one embodiment, the controller 180 is wirelessly connected to the Internet and can generate and/or utilize a service that can issue a text message or other push notification which will be displayed on the building administrator's (or other selected response person's) personal cellular phone. In other embodiments, the fault detection logic 532 can be configured to utilize any inputs 540 or outputs 550 connected to the outside HVAC system 100 to determine if a fault has occurred in a non-air pretreatment unit component. Fault messages may include, but are not limited to, improper set point temperature, improper chilled water conditions, dirty/clogged filter, general airflow problem, failed sensor, and/or failed components.

In one embodiment, in order to input user, configuration, and/or setup data into the air pretreatment unit 170, the user interface logic 533 can generate a user interface configured for data input. For example, the user interface logic 533 can connect to a device and communicate via the data input/output 526 via a hypertext transfer protocol ("HTTP") connection. Once a connection has been established, the user interface logic 533 can generate a hypertext markup language ("HTML") page like a typical web server that can be parsed and displayed on the installer's or building administrator's device via a general web browser. In one embodiment, the web server generated by the user interface logic 533 can be utilized to provide more details and general visibility of the HVAC system 100 compared to the pre-existing HVAC system interface. Interactions between the installer and/or building administrator can be similar to interactions on a web-based HTML page. The user interface logic 533 can facilitate the transfer, input, and display of data between the various logics within the memory 530 of the controller 180. It is contemplated that any type of data that can be input into the controller 180 can be facilitated through a user interface generated by the user interface logic 533. Those skilled in the art will appreciate the variety of methods that data can be entered and received in such a system. Updating of the user interface logic 533 can be done in a variety of methods (e.g. firmware updates, over-the-air updates, customizations entered by a user, etc.) which may also update the user interface generated by the user interface logic 533.

FIGS. 6A-8B illustrate three different climate environments that an HVAC system 100 may operate in. Each figure set highlights the difference between HVAC systems without an air pretreatment unit 170 and HVAC systems 100 with an air pretreatment unit 170 installed.

FIG. 6A shows a schematic example of an HVAC system in a first weather condition without air pretreatment. The first weather condition can represent a peak, sensible load day wherein the outside air 175 has a 92° F. dry bulb ("DB") temperature, a 72° F. dew point ("DP") temperature and an overall 52% relative humidity ("RH"). The HVAC system captures 30% of its needed air from the outside air 175. Conversely, 70% of the return air 145 is utilized which has a 74° F. DB temperature, a 55° F. DP temperature with a RH of 52%.

Because the return air 145 has a dew point temperature of 55° F., the outside air 175 cannot have a dry bulb temperature below 55° F. or else fogging will occur in the mixed air chamber 610. However, as the outside air is very warm in this example, no fogging occurs and the result of the mixture of outside air 175 and return air 145 in FIG. 6A results in a mixed air 610 which has a 79° F. DB, 61° F. DP with 54% RH. As can be seen, the discharge air 640 has a target of 53° F. DP, which is less than the mixed air 61° F. DP, indicating that the cooling coil 620 will have to remove moisture from the mixed air 610 using dehumidification methods. The dehumidification process generates water within the cooling coil 620, which must be removed. The air exiting the cooling coil 620 within the fan section 630 has a 53° F. DB and a 53° F. DP indicating a 100% RH. By the time the air travels to discharge, the DB has been raised to 56° F. and yields a RH of 90% due to absorbing ambient heat within the discharge vents.

Contrast the system of FIG. 6A with that of FIG. 6B, which shows an exemplary schematic example of an HVAC 100 system in the first weather condition with an air pretreatment unit 170 in accordance with an embodiment of the invention. Similar to the conditions in FIG. 6A, the outside air 175 has a 92° F. DB temperature, a 72° F. DP temperature and an overall 52% RH, while the return air has a 74° F. DB temperature, a 55° F. DP temperature with a RH of 52%. The same proportions of outside air 175 and return air 145 are used (30%/70%).

However, the air pretreatment unit 170 is installed to pretreat the outside air 175 and lowers the outside air 175 to 56° F. DB, 48° F. DP, and 75% RH. In order to reduce the dew point temperature, the air pretreatment unit 170 performs dehumidification on the outside air 175, which constitutes 30% of the total air in the system. Moisture is collected within the air pretreatment unit 170 and removed without it travelling downstream into the mixed air chamber or other HVAC system components. When mixed with the return air 145, the mixed air 615 has a 69° F. DB, 53° F. DP, yielding a 58% RH. Unlike the mixed air 610 of FIG. 6A, the mixed air 615 has already achieved the set dew point of the processed discharged air 125. Therefore, the cooling coil 620 will not be required to do any dehumidification of the mixed air 615. The result is that the air coming out of the cooling coil 620 into the fan section 635 has the same 53° F. DB, 53° F. DP and 100% RH as the fan section air 630 of FIG. 6A, resulting in equal discharge of air through the building.

One of the benefits is that the water that would have been extracted by the cooling coil 620 is now no longer going to be present in the HVAC system 100. Reduced moisture increases the lifespan of the cooling coils 620 and the overall HVAC system 100. Another benefit is that the dehumidification only occurred on 30% of the air within the system, which can provide energy savings and/or allow certain HVAC systems 100 to utilize an increased percentage of outside air 175.

Many government entities have established minimum amounts of outside air 175 that must be used within an HVAC system 100. Medical studies have indicated that there could be a link between an increased percentage of outside air 175 used in an HVAC system 100 and a building occupant's health. By allowing an increased usage of outside air 175, the air pretreatment unit 170 can allow building administrators with outdated HVAC systems that cannot provide sufficient outside air the option of complying with local laws and regulations without having to replace a large portion of their HVAC system.

Figure 7A:
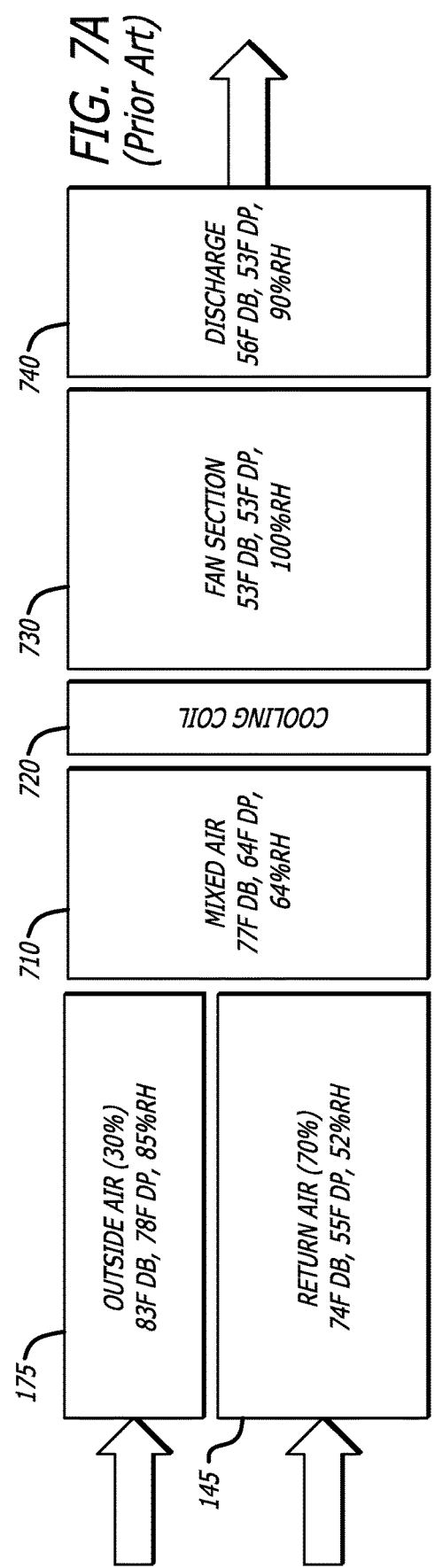
FIG. 7A is a schematic example of an HVAC system in a second weather condition without pretreatment.
Figure 7B:
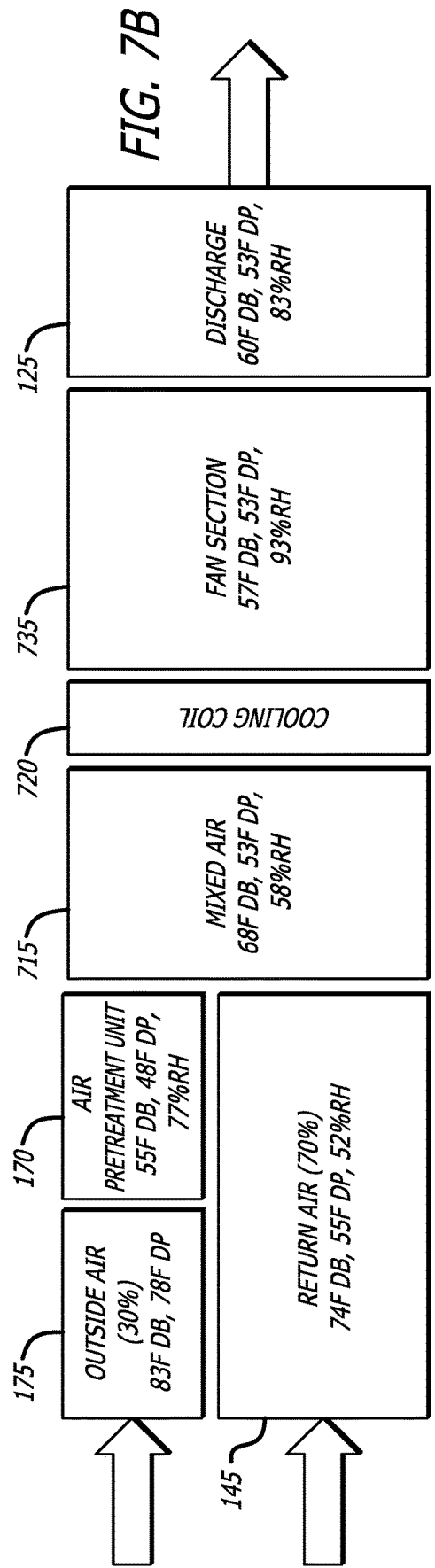
FIG. 7B is an exemplary schematic example of an HVAC system in a second weather condition with air pretreatment in accordance with an embodiment of the invention.

Referring to FIG. 7A shows a schematic example of an HVAC system in a second weather condition without air pretreatment. While the weather conditions illustrated in FIGS. 6A and 6B are typically seen during a peak load period, the outside air 175 being processed in FIGS. 7A and 7B is more of an average load for an HVAC system 100. During climates depicted in FIGS. 7A and 7B, the HVAC system 100 does not need to output discharged air 740 that below 60° F. However, as shown below, in order attain the set dew point temperature, continuous cooling of the mixed air 710 is needed, resulting in an overcooling of the discharge air 740, yielding wasted energy and potentially uncomfortable spaces within the building or structure.

In this example, the outside air 175 has an 83° F. DB, 78° F. DP and 85% RH. The same 30% versus 70% ratio of outside air 175 to return air 145 is utilized. The return air 145 has a 74° F. DB, 55° F. DP, and 52% RH which is similar to the return air in FIGS. 6A and 6B. The mixture of the outside air 175 and return air 145 results in a mixed air 710 which has a 77° F. DB, 64° F. DP with 64% RH. As can be seen, the discharge air 740 has a target of 53° F. DP, which is less than the mixed air of 64° F. DP temperature, indicating that the cooling coil 720 will have to remove even more moisture from the mixed air 710 using dehumidification methods. This will generate even more water within the cooling coil 720 than in the cooling coil 620 of FIG. 6A. The air exiting the cooling coil 720 within the fan section 730 has a 53° F. DB and a 53° F. DP indicating a 100% RH. By the time the air travels to discharge, the DB has been raised to 56° F. and yields a RH of 90%, similar to FIG. 6A.

However, when the air pretreatment unit 710 decouples the sensible and latent load requirements from the HVAC system 100, overcooling is not necessary. The system of FIG. 7B, shows the exemplary schematic of an HVAC system 100 in the second weather condition with an air pretreatment unit 170 in accordance with an embodiment of the invention. Similar to the conditions in FIG. 7A, the outside air 175 has a 92° F. DB temperature, a 72° F. DP temperature and an overall 52% RH, while the return air has a 74° F. DB temperature, a 55° F. DP temperature with a RH of 52%. The same proportions of outside air 175 and return air 145 are used (30%/70%).

The air pretreatment unit 170 pretreats the outside air 175 and lowers the outside air 175 to 55° F. DB, 48° F. DP, and 77% RH. In order to reduce the dew point temperature, the air pretreatment unit 170 performs the dehumidification on the outside air 175. Moisture is again collected and removed within the air pretreatment unit 170 without it travelling downstream into the mixed air chamber or other HVAC system components. When mixed with the return air 145, the mixed air 715 has a 68° F. DB, 53° F. DP, yielding a 58% RH. Similar to FIG. 6B, the mixed air 715 has already achieved the set dew point of the processed discharged air 125. Therefore, the HVAC system 100 only has to process the sensible heat reduction since the cooling coil 720 will not be required to do any dehumidification of the mixed air 715. The result is that the air coming out of the cooling coil 720 into the fan section 735 has 57° F. DB, 53° F. DP and 93% RH, resulting in processed discharge air 125 with 60° F. DB, 53° F. DP and 83% RH, which retains the same set dew point temperature target while having a higher dry bulb temperature. This indicates increased energy savings and can provide more comfortable areas within the building.

Finally, referring to FIG. 8A, a schematic example of an HVAC system in a third weather condition without air pretreatment is shown. The third weather condition is likely what would occur during a mild day or an overnight period. A building administrator may attempt to save energy by turning up the desired dry bulb temperature leaving the air handler due to the lower cooling loads present. However they will want to retain the same set dew point temperature, leaving the HVAC system 100 to dehumidify the mixed air 810, thus overcooling the air more than necessary, losing potential energy savings.

Specifically, the outside air 175 has lower temperatures including a 77° F. DB, a 66° F. DP, and a 69% RH. The return air 145 has the same 74° F. DB, 55° F. DP, and 52% RH as the other FIGS. 6A-7B. The same 30% to 70% ratio of outside air 175 to return air 145 applies. The result is that the mixed air 810 settles at a 75° F. DB temperature, a 59° F. DP temperature, with a 57% RH. Again, although a higher dry bulb temp is desired, because the cooling coil 820 needs to dehumidify the mixed air 810, the resulting fan section air 830 has the same 53° F. DB, 53° F. DP, and 100% RH as the previous traditional systems depicted in FIGS. 6A and 7A. The result is that the discharged air is thus the same at 56° F. DB, 53° F. DP, and 90% RH.

Compared to FIG. 8A, the exemplary schematic of the HVAC system 100 in the third weather condition with an air pretreatment unit 170 in accordance with an embodiment of the invention is shown in FIG. 8B to yield greater energy savings. The air pretreatment unit 170 takes the outside air 175 and pretreats it to a 55° F. DB, 48° F. DP, and 77% RH condition. When mixed with the return air 145, the mixed air 815 has a 68° F. DB temperature, 53° F. DP temperature, and 58% RH. Once again, the mixed air 815 has already achieved the set dew point temperature of the desired processed discharge air 125. This allows the cooling coil 820 to avoid adding moisture into the HVAC system 100 from having to dehumidify the mixed air 815. The cooling coil 820 now only has to handle the sensible load, which can yield air in the fan section 835 with a 59° F. DB, 53° F. DP, and 80% RH instead of at the 100% RH that occurs when the sensible and latent loads are not decoupled within the air handler 110. The final result is a discharge air 125 of 62° F. DB temperature, 53° F. DP temperature, and a 72% RH. While the set dew point temperature has been met, the dry bulb temperature is six degrees higher with the HVAC system 100 with an air pretreatment unit 170 installed, allowing for increased energy savings and improved comfort conditions in the building.

Figure 9:
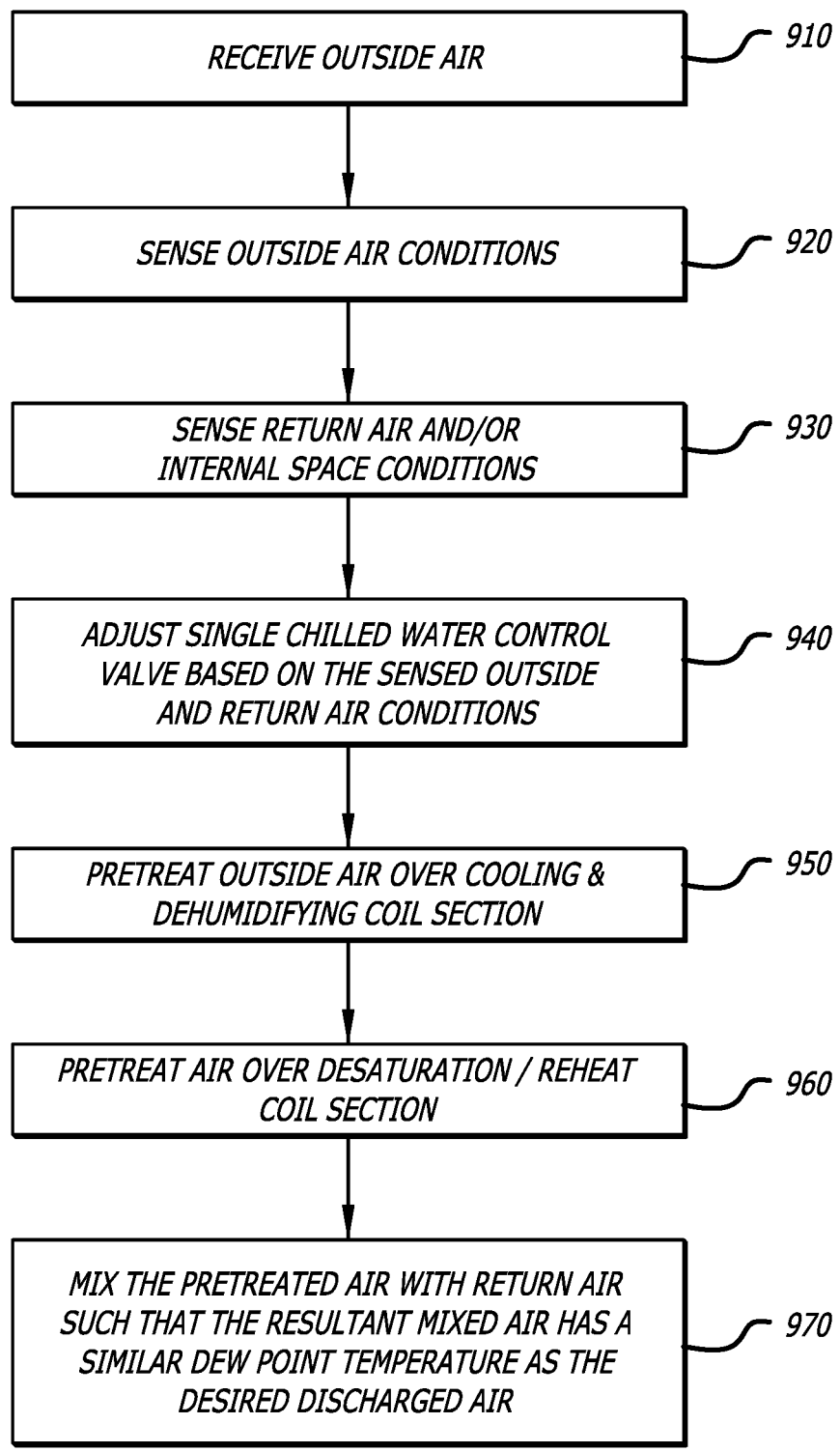
FIG. 9 is an exemplary process of pretreating air within an HVAC system with an air pretreatment unit in accordance with an embodiment of the invention.

Referring to FIG. 9, an exemplary process 900 of pretreating air within an HVAC system 100 with an air pretreatment unit 170 in accordance with an embodiment of the invention is shown. The process 900 of decoupling the sensible and latent loads begins with the receiving of outside air 175 prior to entering an outside air intake 130 of an air handler 110 (block 910). The air introduction is accomplished through a dependence on the existing pressure capacity of the HVAC system 100. In some embodiments, the outside air 175 can also be captured through the use of a fan section module 420.

Prior to pretreating, the air pretreatment unit 170 senses the conditions of the outside air 175 (block 920). Sensing can be done through the use of probes directly attached to the controller 180 of the air pretreatment unit 170, or through a BACnet communication link with another HVAC component that can provide the outside air conditions.

Similarly, the air pretreatment unit 170 can also sense the return air or space conditions (block 930). The methods of sensing the return air 145 or space conditions can comprise methods similar to sensing the outside air conditions. For example, a return air sensor may instead be installed within a specific space to generate space condition data. In other embodiments, the internal space condition data, which may include a plurality of internal space condition data associated with a plurality of internal spaces within a building may be received by the air pretreatment unit 170 via a data connection communicating with the BACnet protocol. Processing of internal space condition data can allow for more optimized configuration settings of the air pretreatment unit and/or control of the HVAC system 100.

Upon sensing the return air, space and/or outside air conditions, the air pretreatment unit 170 can adjust the single chilled water control valve 156 based on the sensed outside and return air conditions (block 940). In many embodiments, the controlling logic 531 calculates a set dew point temperature or other temperature that the pretreated air should acquire such that, when mixed, the dew point temperature of the mixed air will be equal to the desired dew point temperature of the processed discharged air. The controlling logic 531 can facilitate the pretreatment of the outside air 175 to the set dew point by issuing commands to the chilled water control valve 156.

Once the control valve 156 is set, the outside air 175 can then be processed over the cooling and dehumidifying coil section 310 (block 950). During this stage, dehumidification occurs and extracts moisture from the air, lowering the temperature. The water collected on the fins of the cooling and dehumidifying coil 310 falls downward and is collected and expelled from the air pretreatment unit 170. The ability to collect large amounts of water, thus bringing the dew point temperature down within a small physical volume is due to the low airflow rates utilized within the air pretreatment unit 170.

After processing over the cooling and dehumidifying coil section 310, a coil gap 350 is crossed by the air, such that virtually no moisture traverses the coil gap 350. After the coil gap 350, the air is processed over a desaturation/reheat coil section 320 (block 960). While the cooling and dehumidifying coil section 310 cooled down the air enough to collect moisture, the desaturation/reheat coil section 320 can increase the dry bulb temperature if needed. Because virtually no moisture travels across the coil gap 350, the desaturation/reheat coil section 320 is very dry relative to the cooling and dehumidification coil section 310.

After passing through the desaturation/reheat coil section 320, the pretreated air is passed into a mixing chamber to mix with return air 145 and, because of the pretreatment done to the outside air 175, the resultant mixed air comprises a dew point that is generally equal to the desired dew point of the processed discharged air 125 of the HVAC system (block 970). By providing mixed air that has the same dew point temperature as the processed discharge air 125, the HVAC system does not have to work on the latent load and can operate to only change the sensible load. This decoupling of the latent and sensible loads allows the cooling coils of the HVAC system 100 to remain relatively moisture free, which can reduce wear and tear, increase component longevity, and severely eliminate mold, mildew, fungus and other biological contaminants from forming within the downstream HVAC components.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed:

1. A device, comprising:
    an air intake wherein the air comprises a dry bulb temperature and a dew point temperature;
    a two-coil system comprising:
    a cooling coil system to process a change in the dry bulb temperature and dew point temperature of the air; and
    a reheat coil system to process a change in the dry bulb temperature of the air;
    an air outlet configured to direct the processed air for further processing prior to discharge; and
    a single water supply system comprising:
        a chilled water intake coupled to the cooling coil system;
        a chilled water return coupled to the reheat coil system;
        wherein the water supply system is configured for control by a single chilled water valve placed on a chilled water return line coupled to the chilled water return; and
        a chilled water valve controller configured to issue one or more commands to the single chilled water valve wherein the issued commands are configured to direct the changes in the dry bulb temperature and dew point temperature within the cooling coil system.

2. The device of claim 1, wherein the air intake is configured to capture outside air.

3. The device of claim 1, wherein the device is configured to be installed on a preexisting air handling device.

4. The device of claim 1, wherein the device is separable into two distinct parts.

5. The device of claim 4, wherein the first of the two distinct part comprises filtration system, and the second of the two distinct parts comprises the cooling and reheat coil system.

6. The device of claim 4, wherein each of the two distinct parts is configured to fit within a standard width doorframe.

7. The device of claim 1, wherein the two-coil system comprises at least one dimension that is less than thirty two inches.

* * * * *